(12) United States Patent
Parks et al.

(10) Patent No.: US 8,970,844 B2
(45) Date of Patent: Mar. 3, 2015

(54) SIGNAL AMPLIFIER BY TRIPLE MACH-ZEHNDER INTERFEROMETERS

(71) Applicant: United States Government, as represented by the Secretary of the Navy, Arlington, VA (US)

(72) Inventors: Allen D. Parks, Spotsylvania, VA (US); Scott E. Spence, Fredericksburg, VA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 105 days.

(21) Appl. No.: 13/764,796

(22) Filed: Feb. 12, 2013

(65) Prior Publication Data

US 2013/0155411 A1  Jun. 20, 2013

Related U.S. Application Data

(63) Continuation-in-part of application No. 13/199,507, filed on Aug. 24, 2011, now Pat. No. 8,619,261.

(51) Int. Cl.
*G01B 9/02* (2006.01)
*G02F 1/21* (2006.01)
*G06N 99/00* (2010.01)

(52) U.S. Cl.
CPC ............. *G02F 1/21* (2013.01); *G06N 99/002* (2013.01); *G01B 2290/55* (2013.01)
USPC ...................................................... 356/450

(58) Field of Classification Search
CPC .... G02F 1/21; G06N 99/002; G01B 2290/55; H04B 10/70; H04L 9/0852
USPC ....................................................... 356/450
See application file for complete search history.

(56) References Cited

U.S. PATENT DOCUMENTS

| 4,395,269 A | 7/1983 | Schuler | 55/302 |
| 5,732,139 A | 3/1998 | Lo et al. | 380/28 |

(Continued)

OTHER PUBLICATIONS

Scott E. Spence, Allen D. Parks, and David A. Niemi, "Methods used to observe a dynamical quantum nonlocality effect in a twin Mach-Zehnder interferometer," posted Oct. 19, 2012, published Nov. 9, 2012, Applied Optics, vol. 51, No. 32, p. 7853-7857.*

(Continued)

*Primary Examiner* — Kara E Geisel
*Assistant Examiner* — Violeta A Prieto
(74) *Attorney, Agent, or Firm* — Gerhard W. Thielman, Esq.

(57) ABSTRACT

A signal amplifier is provided via a triple Mach-Zehnder interferometer (MZI) apparatus for determining intensity distribution at either a first port or a second port by a photon from a source. The first and second ports correspond to respective first and second directions. The MZI apparatus includes four beam-splitters disposed co-linearly in parallel between the source and the ports, six parallel mirrors, and first and second path projectors. Three of these mirrors are displaced along the first direction from the beam-splitters, while the remaining mirrors are displaced along the second direction. The path projectors conduct weak measurement of a photon occupation number and are disposed between the second beam-splitter and an adjacent downstream mirror. The output port is disposed beyond the fourth beam-splitter in the first direction. The intensity distribution at the output port is positive in response to one of the first measurement being positive and the second measurement being negative.

5 Claims, 1 Drawing Sheet

(56) References Cited

U.S. PATENT DOCUMENTS

| | | | | |
|---|---|---|---|---|
| 5,999,285 | A | 12/1999 | Brandt et al. | 359/112 |
| 6,240,221 | B1* | 5/2001 | Thompson | 385/14 |
| 6,583,881 | B2* | 6/2003 | Williams et al. | 356/450 |
| 7,006,635 | B2 | 2/2006 | Parks et al. | 380/263 |
| 7,135,700 | B2 | 11/2006 | Lofts | 257/24 |
| 7,304,314 | B2 | 12/2007 | Zaugg | 250/458.1 |
| 7,583,803 | B2 | 9/2009 | Trifonov | 356/317 |
| 7,831,048 | B2 | 11/2010 | Kastella et al. | 380/256 |
| 8,149,494 | B1* | 4/2012 | Spence | 359/288 |
| 8,391,486 | B2* | 3/2013 | Troupe | 380/256 |
| 8,411,278 | B2* | 4/2013 | Parks et al. | 356/450 |
| 8,493,066 | B2 | 7/2013 | Parks | 324/244.1 |
| 8,514,478 | B1* | 8/2013 | Spence | 359/288 |
| 8,520,214 | B2 | 8/2013 | Parks et al. | 356/465 |
| 8,619,261 | B2* | 12/2013 | Parks et al. | 356/450 |
| 8,674,688 | B2 | 3/2014 | Parks et al. | 324/244.1 |
| 2012/0242999 | A1* | 9/2012 | Turner et al. | 356/491 |
| 2012/0313634 | A1 | 12/2012 | Parks | 324/244.1 |
| 2012/0314215 | A1 | 12/2012 | Parks et al. | 356/364 |
| 2012/0314863 | A1* | 12/2012 | Troupe | 380/256 |
| 2013/0017323 | A1 | 1/2013 | Garces et al. | 356/149 |
| 2013/0027710 | A1* | 1/2013 | Parks et al. | 356/450 |
| 2013/0050707 | A1* | 2/2013 | Parks et al. | 356/450 |

OTHER PUBLICATIONS

A. Tonomura et al., "Demonstration of single electron buildup of an interference pattern", Am. J. Phys. 57 117-20 (1989). https://www.u-cursos.cl/ingenieria/2007/2/F134A/1/material_docente/objeto/139739.

Y. Aharonov et al., "Modular Variables . . . ", Int. J. Theor. Phys. 2 213:19 (1969). http://www.tau.ac.il/~yakir/yahp/yh142.pdf.

Y. Aharonov et al., "Deterministic Quantum Interference Experiments" Int. J. Theor. Phys. 3 443-48 (1970). http://www.tau.ac.il/~yakir/yahp/yh140.pdf.

J. Tollaksen et al., "Quantum interference experiments, modular variables and weak measurements" New J. of Phys. 12 013023 (2010). http://anciv.org/PS_cache/arxiv/pdf/0910/0910.4227v1.pdf.

S. E. Spence et al., "Experimental Evidence for a Dynamical Non-Locality Induced Effect in Quantum Interference Using Weak Values" (2010). http://arvix.org/PS_cache/arxiv/pdf/1010/1010.3289v1.pdf.

I. M. Duck et al., "The sense in which a 'weak measurement' of a spin-½ particle's spin component yields a value 100" Phys. Rev. D 40 2112-17 (1989). http://prd.aps.org/pdf/PRD/v40/i6/p2112_1.

A. Parks et al., "Observation and measurement of an optical AAV effect" Proc. Roy. Soc. Lond. A, 454 2997-3008 (1990).

Y. Aharonov et al., "How the Result of a Measurement of a Component of the Spin of a Spin-½ Particle Can Turn Out to be 100", Phys. Rev. Ltrs, 60 (1988), 14 1351-54. http://www.tau.ac.il/~vaidman/lvhp/m8.pdf.

Y. Aharonov et al., "Properties of a quantum system . . . " Phys. Rev. A, 41 (1990) http://pra.aps.org/pdf/PRA/v41/i1/p11_1.

N. W. M. Ritchie et al., "Realization of a Measurement of a 'Weak Value'", Phys. Rev. Lett, 66 (1991) 1107-1110.

P. Dixon et al., "Ultrasensitive Beam Deflection Measurement via Interferometric Weak Value Amplification", Phys. Rev. Lett, 102 173601 (2009). http://arxiv.org/PS_cache/arvix/pdf/0906/0906.4828v1.pdf.

G. G. Gillett et al., "Experimental Feedback Control of Quantum Systems Using Weak Measurements", Phys. Rev. Lttrs. 104 (8) 080503(4) (2010). http://arxiv.org/PS_cache/arxiv/pdf/0911/0911.3698v2.pdf.

A. D. Parks et al., "Paradoxical behavior in a triple cascade of Mach-Zehnder interferometers", J. Phys A. 46 (2013): http://iopscience.iop.org/1751-8121/46/3/035303/pdf/1751-8121_46_3_035303.pdf.

K. Resch et al., "Nonlineaer Optics with Less than One Photon" Phys. Lett. A, 324 125 (2004). http://prl.aps.org/pdf/PRL/v87/i12/e123603.

Q. Wang et al., "Experimental demonstration of a method to realize weak measurement of the arrival time of a single photon", Phys. Rev. A 73, 2, 023184 (2006) http://pra.aps.org/pdf/PRA/v73/i2/e023814.

O. Hosten et al., "Observation of the Spin Hall Effect of Light via Weak Measurements", Science 319, 787 (2008).

K. Yokota et al., "Direct observation of Hardy's paradox by joint weak measurement with an entangled photon pair", New J. Phys. 11, 033011 (2009) http://iopscience.iop.org/1367-2630/11/3/033011/pdf/1367-2630_11_3_033011.pdf.

A. Broduteh, "Weak measurements and the two state vector formalism" May 5, 2014 Lecture Notes. https://uwaterloo.ca/institute-for-quantum-computing/sites/ca.institute-for-quantum-computing/files/uploads/files/ab_11.pdf.

A. Steinberg et al., "In praise of weakness", Physics World Mar. 7, 2013, 35-40 http://physics.gu.se/~tfkhj/PhysicsWorldMacth2013.pdf. (complete issue) and http://www.physics.utoronto.ca/~aephraim/PWMar13steinberg-final.pdf.

B. Tamir et al., "Introduction to Weak Measurements and Weak Values", Quanta 2 (I) 7-14, 2013. http://quanta.ws/ojs/index.php/quanta/article/download/14/21.

A. Bednorz et al., "Noninvasiveness and time symmetry of weak measurements", New J. of Physics 15 023043 (2013). http:/www.fuw.edu.pl/~abednorz/tasym/noni.pdf.

Y. Shikano, "Theory of 'Weak Value' and Quantum Mechanical Measurements", ch. 4 (75-100), from M. R. Pahlavani, ed., Measurements in Quantum Mechanics © 2012. http://cdn.intechopen.com/pdfs-wm/29089.pdf.

X. Zhu et al., "Negative probabilities and information gain in weak measurements" Phys. Rev. A, 377 (2013) 2505-2509. http://web.xidian.edu.cn/qunwei/files/20131102_013919.pdf.

S. Tamante et al., "Geometrical aspects of weak measurements and quantum erasers", New J. of Physics 11 093025 (2011). http://iopscience.iop.org/1367-2630/11/9/093025/pdf/1367-2630_11_9_093025.pdf.

* cited by examiner

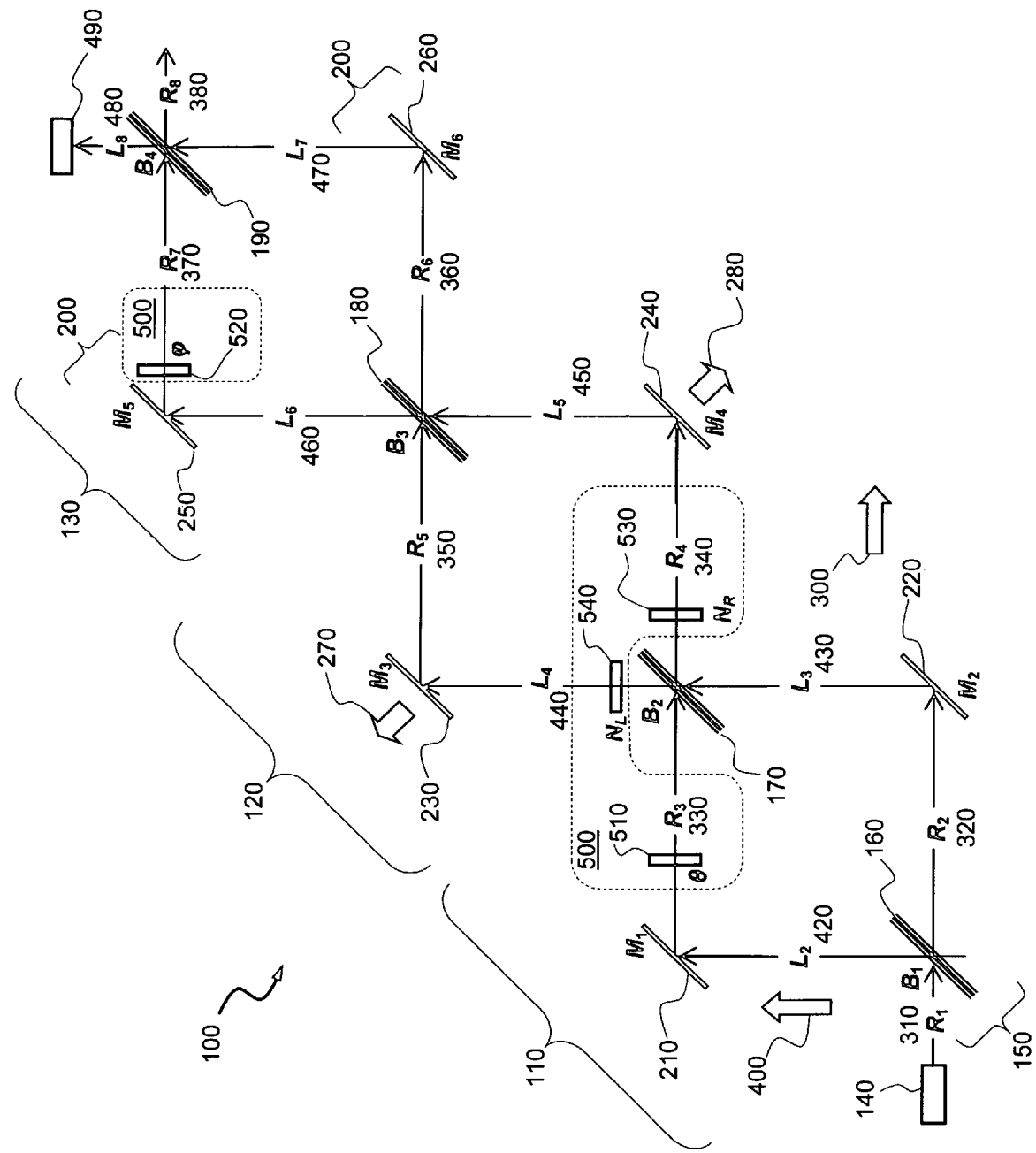

SIGNAL AMPLIFIER BY TRIPLE MACH-ZEHNDER INTERFEROMETERS

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to quantum mechanical signal amplifiers. In particular, the invention relates to a triple Mach-Zehnder interferometer (MZI) configuration for augmenting signals by determining photon intensity via weak measurements.

I. Overview:

The weak value $A_w$ of a quantum mechanical observable $\hat{A}$ was introduced by Aharonov et al. a quarter century ago. See Y. Aharonov et al., Ann. N.Y. Acad. Sci. 480 417-421 (1986); Y. Aharonov et al., *Phys. Rev. Lett.* 60 1351 (1988); and Y. Aharonov et al., *Phys. Rev.* A 41 11 (1990). This quantity is the statistical result of a standard measurement procedure performed upon a pre- and post-selected (PPS) ensemble of quantum systems when the interaction between the measurement apparatus and each system is sufficiently weak, i.e., when it is a weak measurement. Unlike a standard strong measurement of observable $\hat{A}$, which significantly disturbs the measured system (i.e., such interrogation "collapses" the wave function), a weak measurement of $\hat{A}$ for a PPS system does not appreciably disturb the quantum system and yields $A_w$ as the observable's measured value.

The peculiar nature of the virtually undisturbed quantum reality that exists between the boundaries defined by the PPS states is revealed in the eccentric characteristics of $A_w$, namely that $A_w$ is complex valued and that the real $\mathrm{Re}\, A_w$ and imaginary $\mathrm{Im}\, A_w$ of $A_w$ can be extremely large and lie far outside the eigenvalue spectral limits of $\hat{A}$. This causes the pointer of a measurement apparatus to experience translations much greater than those obtained from standard strong measurements.

Although the interpretation of weak values remains somewhat controversial, experiments have verified several of the interesting unusual properties predicted by weak value theory. See N. Richie et al., *Phys. Rev. Lett.* 66 1107 (1991); A. Parks et al., *Proc. R. Soc.* A 454 2997 (1998); K. Resch et al., *Phys. Lett.* A 324 125 (2004); Q. Wang et al., *Phys. Rev* A 73 023814 (2006); O. Hosten et al., *Science* 319 787 (2008); Y. Yokota et al., *New J. Phys.* 11 033011 (2009); and P. Dixon et al., *Phys. Rev. Lett.* 102 173601 (2009).

II. Weak Values:

Weak measurements arise in the von Neumann description of a quantum measurement at time $t_0$ of a time independent observable $\hat{A}$ that describes a quantum system in an initial pre-selected state $|\psi_1\rangle = \Sigma_j c_j |a_j\rangle$ at $t_0$, where the set J indexes the eigenstates $|a_j\rangle$ of observable $\hat{A}$. In this description, the Hamiltonian for the interaction between the measurement apparatus and the quantum system is:

$$\hat{H} = \gamma(t)\hat{A}\hat{p}, \quad (1)$$

where $\gamma(t) = \gamma\delta(t-t_0)$ defines the strength of the measurement's impulsive coupling interaction at $t_0$ and $\hat{p}$ is the momentum operator for the pointer of the measurement apparatus which is in the initial normalized state $|\phi\rangle$.

Let $\hat{q}$ be the pointer's position operator that is conjugate to $\hat{p}$. Prior to the measurement, the pre-selected system and the pointer are in the tensor product state $|\psi_1\rangle|\phi\rangle$. Immediately following the interaction, the combined system is in the state:

$$|\Phi\rangle = e^{-\frac{i}{\hbar}\int \hat{H}dt}|\psi_i\rangle|\varphi\rangle \qquad (2)$$
$$= \left(e^{-\frac{i}{\hbar}\gamma\hat{A}\hat{p}}|\psi_i\rangle\right)|\varphi\rangle,$$

where $$e^{-\frac{i}{\hbar}\gamma\hat{A}\hat{p}}$$

is the von Neumann measurement operator. If the state $|\psi_f\rangle = \Sigma_j c'_j |a_j\rangle$, $\langle\psi_f|\psi_i\rangle \neq 0$ is post-selected at $t_0$, then the resulting pointer state is:

$$|\Psi\rangle \equiv \langle\psi_f|\Phi\rangle = \langle\psi_f| e^{-i\gamma\hat{A}\hat{p}/\hbar} |\psi_i\rangle |\phi\rangle. \qquad (3)$$

A weak measurement of observable $\hat{A}$ occurs when the interaction strength $\gamma$ is sufficiently small so that the system is essentially undisturbed, and the pointer's uncertainty $\Delta q$ is much larger than $\hat{A}$'s eigenvalue separation. In this case, eqn. (3) becomes:

$$|\Psi\rangle \approx \langle\psi_f|\hat{1} - \frac{i}{\hbar}\gamma\hat{A}\hat{p}|\psi_i\rangle|\varphi\rangle \approx \langle\psi_f|\psi_i\rangle\hat{S}(\gamma A_w)|\varphi\rangle, \qquad (4)$$

where $$A_w \equiv \frac{\langle\psi_f|\hat{A}|\psi_i\rangle}{\langle\psi_f|\psi_i\rangle} \qquad (5)$$

is the weak value of observable $\hat{A}$, and the $\hat{S}(\gamma A_w)$ operator is defined as:

$$\hat{S}(\gamma A_w) \equiv e^{-\frac{i}{\hbar}\gamma A_w \hat{p}}. \qquad (6)$$

Note that $A_w$ can be calculated from eqn. (5) when the states and $\hat{A}$ are known. In order for the measurement to qualify as a weak measurement, the following weakness conditions must be simultaneously satisfied:

$$\Delta p \ll \frac{\hbar}{\gamma}|A_w|^{-1} \qquad (7)$$

and $$\Delta p \ll \min_{(m=2,3,\ldots)} \frac{\hbar}{\gamma}\left|\frac{A_w}{(A^m)_w}\right|^{\frac{1}{m-1}}.$$

This is shown in A. Parks et al., Proc. R. Soc. A 454 2997 (1998) and I. Duck et al., *Phys. Rev.* D 40 2112 (1989).

SUMMARY

Conventional quantum mechanical signal amplifiers yield disadvantages addressed by various exemplary embodiments of the present invention. In particular, various exemplary embodiments provide a signal amplifier via a triple Mach- Zehnder interferometer (MZI) apparatus for determining intensity distribution at an output port of the triple MZI from a source.

In exemplary embodiments, the MZI apparatus includes four beam-splitters disposed co-linearly in parallel between the source and the ports, six mirrors, with three of these disposed co-linearly in parallel and displaced along the first direction, the remainder disposed co-linearly in parallel and displaced along the second direction, along with first and second path projectors for conducting respective weak measurement of a photon occupation number.

The projectors are disposed between the second beam-splitter and an adjacent downstream mirror. In exemplary embodiments, actual measurement of the projectors is performed by small displacements of the adjacent mirrors, which are recorded by translations on the photon intensity distribution at one of first or second ports that becomes the output port.

The output port is disposed beyond the fourth beam-splitter in the first direction. The intensity distribution at the output port is positive in response to one of the first measurement being positive and the second measurement being negative. Other various embodiments alternatively or additionally provide for first and second phase shift windows for selecting respective first and second phase angles, whose offset from one-half $\pi$ augments the intensity distribution. The phase windows are respectively disposed in the first MZI and the third MZI.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIG. is a schematic view of a triple Mach-Zehnder interferometer.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with a presently preferred embodiment of the present invention, the components, process steps, and/or data structures may be implemented using various types of operating systems, computing platforms, computer programs, general purpose machines and/or hardwired devices. General purpose machines include devices that execute instruction code. A hardwired device may constitute an application specific integrated circuit (ASIC) or a field programmable gate array (FPGA) or other related component.

In various exemplary embodiments of a sequential cascade of three MZIs, when the first Mach-Zehnder interferometer (MZI) is used to judiciously prepare the pre-selected state of classically intense laser light launched into one of its input ports and the third MZI in the cascade is used to judiciously prepare the post-selected state of light emerging from one of its output ports, then the intensity distribution of the light emerging from that output port exhibits highly non-linear behavior when a weak measurement of photon occupation number is performed in the second MZI.

Specifically, the pointer at the output port registers an arbitrarily large positive photon occupation number in one leg of the second MZI. If the photon occupation number in the other leg is then measured, the pointer registers an arbitrarily large negative occupation number. However, the sum of these two measurements is always equal to the number of photons in the interferometer. This seemingly paradoxical behavior is a consequence of weak measurements and the time symmetric property of quantum mechanics.

The summary includes (I) a brief overview of the theory of weak measurements, and (II) weak values in TSQM, as described above. The disclosure presents (III) introductory comments, (IV) a cascade apparatus, (V) projection and phase shift, with induced non-linear behavior, (VI) identification of the measured photon occupation number paradox, and (VII) TSQM MZI transformations associated with the cascade apparatus.

III. Introductory Comments:

A highly non-linear optical effect was recently discovered at Naval Surface Warfare Center—Dahlgren Division. This effect is largely a consequence of time symmetric quantum mechanics (TSQM). See Y. Aharonov et al., *Physics Today* November 2010, 27-32. TSQM manifests as a relatively large and sudden translation in the intensity distribution profile of the light emerging from an output port in the third MZI (of a sequential cascade of three MZIs) in response to (1) injecting classically intense laser light into an input port of the first MZI, (2) performing a weak measurement of photon occupation number in the second MZI, and (3) selecting approximate phase settings for wave function shifts $\theta$ and $\phi$.

Such large and sudden translations are induced by the large weak values of the photon occupation number measured in the second MZI. More specifically, these translations result from the "creation" of an arbitrarily large positive weakly measured photon occupation number in one leg of the second MZI and an associated "creation" of a large negative weakly measured photon occupation number in the other leg of that MZI. Paradoxically, the total photon occupation number in the cascade never exceeds the number input because the sum of these large positive, and negative weakly measured occupation numbers in each MZI leg always equals unity.

The operator $\hat{S}$ defined in eqn. (6) is the translation operator for $|\phi\rangle$ defined by the action;

$$\langle q|\hat{S}(\gamma A_w)|\phi\rangle = \phi(q - \gamma \text{Re} A_w). \tag{8}$$

The associated pointer intensity distribution profile $|\langle q|\Psi\rangle|^2$ approximated by:

$$|\langle q|\Psi\rangle|^2 \approx |\langle \psi_f|\psi_i\rangle|^2 |\phi(q - \gamma \text{Re} A_w)|^2 \tag{9}$$

corresponds to a broad distribution profile with a single peak at $\gamma \text{Re} A_w$.

One can assume that wave function $\phi(q)$ is real valued. Thus, after the measurement the mean pointer position is:

$$\langle \Psi|\hat{q}|\Psi\rangle = \langle \phi|\hat{q}|\phi\rangle + \gamma \text{Re} A_w, \tag{10}$$

i.e., the pointer is translated by $\gamma \text{Re} A_w$ from its initial position before the measurement. (Although this position translation is mathematically linear, for these purposes, this translation is called non-linear because of its large magnitude and the fact that this can occur suddenly.) One should note that although the weak measurement of $\hat{A}$ occurs at time $t_0$ so that $|\psi_i\rangle$ and $|\psi_f\rangle$ are states at $t_0$, these states result from other states that are pre-selected and post-selected at times $t_i<t_0$ and $t_f>t_0$, respectively. Therefore, it is necessary to propagate the pre-selected state forward in time from $t_1$ to $t_0$ and the post-selected state backward in time from $t_f$ to $t_0$ in order to calculate $A_w$ at $t_0$. This forward and backward in time propagation of states is the aspect of TSQM involved for exemplary embodiments.

IV. Cascade Apparatus:

FIG. 1 shows a schematic view 100 of an exemplary apparatus that can be used to induce non-linear behavior in the emerging light of the triple MZI cascade in concatenated diamonds formation. The view features a first MZI 110, a second MZI 120, and a third MZI 130. A laser 140 provides input photons as a source. Components for these MZIs 110, 120 and 130 include 50/50 beam-splitters 150, specifically first $B_1$ 160, second $B_2$ 170, third $B_3$ 180 and fourth $B_4$ 190; and mirrors 200, specifically first $M_1$ 210, second $M_2$ 220, third $M_3$ 230, fourth $M_4$ 240, fifth $M_5$ 250 and sixth $M_6$ 260. The third and fourth mirrors 230 and 240 can be laterally displaced perpendicular to the mirror's parallel orientation as denoted by arrows 270 and 280.

The beam-splitters 150 are disposed co-linearly and mutually in parallel. Of the mirrors 200, the first $M_1$ 210, third $M_3$ 230 and fifth $M_5$ 250 are disposed co-linearly between the respective beam-splitters 150 and displaced to left flank (i.e., upward in view 100); and the second $M_2$ 220, fourth $M_4$ 240 and sixth $M_6$ 260 are similarly disposed and displaced to right flank (i.e., starboard).

Paths of the photons include left (upward) and right (rightward) in view 100. The right paths 300 include: first $R_1$ 310, second $R_2$ 320, third $R_3$ 330, fourth $R_4$ 340, fifth $R_5$ 350, sixth $R_6$ 360, seventh $R_7$ 370 and eighth $R_8$ 380. The left paths 400 include: second $L_2$ 420, third $L_3$ 430, fourth $L_4$ 440, fifth $L_5$ 450, sixth $L_6$ 460, seventh $L_7$ 470 and eighth $L_8$ 480 with a detector 490 as an output port at the end. Path indicators 500 include first phase shift window 510 having phase shift angle $\theta$ in the first MZI 110, second phase shift window 520 having phase shift angle $\phi$ in the third MZI 130, right projector $\hat{N}_R$, 530, and left projector $\hat{N}_L$ 540, both within the second MZI 120. The projectors $\hat{N}_R$ 530 and $\hat{N}_L$ 540 are effectively measured by laterally displacing the third and fourth mirrors $M_3$ 230 and $M_4$ 240.

The first right path $R_1$ 310 operates between the laser 140 and the first beam-splitter 160. The second right path $R_2$ 320 operates between the first beam-splitter $B_1$ 160 and the first mirror $M_1$ 210. The third right path $R_3$ 330 operates between the second mirror $M_2$ 220 and the $\theta$ phase shift window 510. The fourth right path $R_4$ 340 operates between the second beam-splitter $B_2$ 170 and the third mirror $M_3$ 230, which measures the projector $\hat{N}_R$ 530. The fifth right path $R_5$ 350 operates between the fourth mirror $M_4$ 240 and the third beam-splitter $B_3$ 180. The sixth right path $R_6$ 360 operates between the third beam-splitter $B_3$ 180 and the fifth mirror $M_5$ 250. The seventh right path $R_7$ 370 operates between the sixth mirror $M_6$ 260 and the $\phi$ phase shift window 520. The eighth right path $R_8$ 380 exits the fourth beam-splitter $B_4$ 190.

The second left path $L_2$ 420 (with no such "first") operates between the first beam-splitter $B_1$ 160 and the second mirror $M_2$ 220. The third left path $L_3$ 430 operates between the first mirror $M_1$ 210 and the second beam-splitter $B_2$ 170. The fourth left path $L_4$ 440 operates between the second beam-splitter $B_2$ 170 and the fourth mirror $M_4$ 240, which measures the projector $\hat{N}_L$ 540. The fifth left path $L_5$ 450 operates between the third mirror $M_3$ 230 and the third beam-splitter $B_3$ 180. The sixth left path $L_6$ 460 operates between the third beam-splitter $B_3$ 180 and the sixth mirror $M_6$ 260. The seventh left path $L_7$ 470 operates between the fifth mirror $M_5$ 250 and the fourth beam-splitter $B_4$ 190. The eighth left path $L_8$ 480 operates between the fourth beam-splitter $B_4$ 190 and the detector 490.

The beam-splitters $B_1$ 160 and $B_2$ 170 together with the mirrors $M_1$ 210 and $M_2$ 220 comprise the first MZI 110. The beam-splitters $B_2$ 170 and $B_3$ 180 together with the third and fourth mirrors $M_3$ 230 and $M_4$ 240 comprise the second MZI 120. The beam-splitters $B_3$ 180 and $B_4$ 190 together with the mirrors $M_5$ 250 and $M_6$ 260 comprise the third MZI 130. The paths followed by photons from the laser 140 in the apparatus have been labeled $R_1$ 310, $R_2$ 320, ..., $R_8$ 380, $L_2$ 420, $L_3$ 430, ..., $L_8$ 480, where $R_1$ 310 is the input port, and paths $R_8$ 380 and $L_8$ 480 are output ports with path $L_8$ 480 leading to detector 490. The spatial modes associated with these paths 300 and 400 are the states: $|R_1\rangle, |R_2\rangle, ... |R_8\rangle, |L_2\rangle, |L_3\rangle, ... |L_8\rangle$, respectively.

Phase shift windows, respectively labeled 510 for $\theta$ and 520 for $\phi$, indicate that the photons traversing the apparatus along paths $R_3$ 330 and $R_7$ 370 are phase shifted by respective phase angles $\theta$ and $\phi$. Weak measurement indicators, respectively labeled 540 for $N_L$ and 530 for $N_R$ along paths $L_4$ and $R_4$, indicate that a weak measurement is made of the photon occupation number in either path $L_4$ or $R_4$ by laterally displacing the respective fourth or third mirrors, $M_4$ 240 or $M_3$ 230.

The quantum mechanical operators associated with these occupation number measurements, are the respective indicator observables: $\hat{N}_L = |L_4\rangle\langle L_4|$ and $\hat{N}_R = |R_4\rangle\langle R_4|$, at the projectors 540 and 530. Weak measurements of these operators are performed by translating mirror $M_4$ 240 or $M_3$ 230 by a small distance $l$ from their initial "tuned" positions in the direction of the respective arrows 280 and 270 perpendicular to their orientation, shown in view 100. These translation distances correspond to the measurement interaction strength $\gamma$ and must satisfy the weakness conditions in eqn. (7). See S. Spence et al., "Experimental Evidence for a Dynamical Non-Locality Induced Effect in Quantum Interference using Weak Values", *Found. Phys.* 42 (6) 803-815 (2012) at http://arxiv.org/pdf/1010.3289v1.pdf.

V. Projection and Phase Shift:

To see this, consider the time integral of eqn. (1) given by:

$$\int \hat{H}\, dt = \gamma \hat{A}\, \hat{p}. \tag{11}$$

The observables $\hat{A} = \hat{N}_L$ or $\hat{A} = \hat{N}_R$ are dimensionless quantities. Because $\hat{p}$ has units of momentum, then interaction strength $\gamma$ must have units of distance in order that the argument of the von Neumann measurement operator remain dimensionless. Consequently, here strength equals distance such that $\gamma = l$.

Also, because $\hat{N}_L$ and $\hat{N}_R$ denote projectors 540 and 530, then $$\hat{N}_L^n = \hat{N}_L \text{ and } \hat{N}_R^n = \hat{N}_R, n \geq 1, \tag{12}$$

so that the inequalities in eqn. (7) become:

$$\Delta p \ll \frac{\hbar}{\gamma |N_w|} \tag{13}$$

and $$\Delta p \ll \frac{\hbar}{\gamma},$$

where the projector weak value is an element of left and right indicators 540 and 530, such that $N_w \in \{(N_L)_w, (N_R)_w\}$.

Application of the uncertainty principle:

$$\Delta q \cdot \Delta p \geq \frac{\hbar}{2} \quad (14)$$

to these inequalities yields distance inequalities:

$$l \ll \frac{2\Delta q}{|N_w|} \quad (15)$$

and $$l \ll 2\Delta q,$$

where the width of the laser beam defines the uncertainty $\Delta q$ in photon position. Because, both of these inequalities are satisfied when $l \ll 2\Delta q$, then this is the condition the mirror displacement distance must satisfy in order that the measurement formally qualify as a weak measurement.

However, experience has shown that non-linear behavior is exhibited even when distance is less than or approximately equal to double the uncertainty $l \lesssim 2\gamma q$. Suppose light is injected by the laser 140 into an input port (i.e., along path $R_1$ 310) and the light emerging from the apparatus is observed at output port $L_8$ 480 (e.g., by a charge-couple device (CCD) camera at detector 490). In this case, mode $|R_1\rangle$ is the pre-selected state prior to the weak measurement of photon number in either path $L_4$ 440 or $R_4$ 340 and mode $|L_8\rangle$ is the post-selected state after the measurement.

TSQM requires that these states must be forward and backward propagated through the apparatus to paths $R_4$ and $L_4$ in the second MZI 120 where the weak measurements are made. Using the forward and backward transformations for 50/50 beam-splitters 150, mirrors 200, and phase shifter windows 510 and 520 as described subsequently, the pre-selected state forward propagates to:

$$|R_1\rangle \rightarrow -\frac{1}{2}[i(1-e^{-i\varphi})|L_4\rangle - (1+e^{-i\varphi})|R4\rangle] \equiv |\psi_i\rangle, \quad (16)$$

and the post-selected state backward propagates to:

$$|L_8\rangle \rightarrow -\frac{1}{2}[i(1-e^{-i\varphi})|L_4\rangle - i(1+e^{-i\varphi})|R_4\rangle] \equiv |\varphi_f\rangle. \quad (17)$$

An equivalent manner to consider these forward and backward propagations is to consider $|\psi_i\rangle$ as the pre-selected state prepared by the first MZI 110 and $|\psi_f\rangle$ as the post-selected state prepared by the third MZI 130, and $M_3$ 230 or $M_4$ 240 in the second MZI 120.

Using these states in eqn. (5), satisfying observable $\hat{A}=\hat{N}_L$ or $\hat{A}=\hat{N}_R$ yields the following weak values for the associated occupation numbers.

$$-\frac{1}{2}[(1-e^{i\varphi})\langle L_4| + i(1+e^{i\varphi})\langle R_4|]|L_4\rangle\langle L_4| \quad (18)$$

$$(N_L)_w = \frac{\frac{1}{2}[i(1-e^{i\theta})|L_4\rangle - (1+e^{i\theta})|R_4\rangle]}{-\frac{1}{2}[(1-e^{i\varphi})\langle L_4| + i(1+e^{i\varphi})\langle R_4|]}$$

$$\frac{1}{2}[i(1-e^{i\theta})|L_4\rangle - (1+e^{i\theta})|R_4\rangle]$$

or $$(\hat{N}_L)_w = \frac{1}{2}\Big[1 - \frac{\cos\theta + \cos\varphi}{1+\cos(\theta-\varphi)}\Big], \quad (19)$$

and $$(\hat{N}_R)_w = \frac{1}{2}\Big[1 + \frac{\cos\theta + \cos\varphi}{1+\cos(\theta-\varphi)}\Big], \quad (20)$$

which is obtained by replacing $|L_4\rangle\langle L_4|$ with $|R_4\rangle\langle R_4|$ in eqn. (18).

Non-linear behavior can be induced in the apparatus by selecting the phase shift angles to be precisely so that difference angles $\delta$ and $\epsilon$ satisfy:

$$\theta = \frac{\pi}{2} + \delta \quad (21)$$

and $$\varphi = \frac{\pi}{2} + \varepsilon,$$

where either $0 \leq \delta \ll 1$ and $0 < \epsilon \ll 1$, or else $0 < \delta \ll 1$ and $0 \leq \epsilon \ll 1$ (Note that for such angles, the term "small" is employed in the, trigonometric sense, such that an angle's sine approximates the angle in radians.) In this case, rewriting eqn. (19) yields approximate reciprocal relations:

$$(\hat{N}_L)_w \approx \frac{1}{2}\Big[1 + \frac{2}{\delta+\varepsilon}\Big] \sim \frac{1}{\delta+\varepsilon}, \quad (22)$$

and similarly rewriting eqn. (20) yields:

$$(\hat{N}_R)_w \approx \frac{1}{2}\Big[1 - \frac{2}{\delta+\varepsilon}\Big] \sim -\frac{1}{\delta+\varepsilon}. \quad (23)$$

Thus, for arbitrarily small $\delta$ and $\epsilon$, then $(\hat{N}_L)_w$ is an arbitrarily large positive number and $(\hat{N}_R)_w$ is an arbitrarily large negative number. Such values can be considered detectably significant. This is due to the fact that the denominator in eqn. (5) is small because $|\psi_i\rangle$ and $|\psi_f\rangle$ in the second MZI 120 are nearly orthogonal when $$\langle \psi_f | \psi_i \rangle \approx \frac{1}{4}(\delta+\varepsilon)[(\delta-\varepsilon)-2i]. \quad (24)$$

One should note in eqns. (24) and (9) that the intensity of light emerging from output port $L_8$ 480 is attenuated by the factor $\sim(\delta+\epsilon)^2$. For either weak measurement, the non-linear behavior is observed at output port $L_8$ 480. The photon intensity profile is translated at the detector 490 in the plane of view 100 and transverse to port $L_8$ 480 in accordance with eqns. (9) and (10), with $\gamma=1$ and either $A_w=(\hat{N}_L)_w$ or $A_w=(\hat{N}_w)_w$. One can observe from eqns. (22) and (23) that the translations for each weak value are in opposite directions.

VI. The Photon Occupation Number Paradox:

Assume that a single photon from laser 140 is injected into the apparatus at input port $R_1$ 310 and that standard strong measurements of $\hat{N}_L$ at 540 or $\hat{N}_R$ at 530 are made in paths $L_4$ 440 and $R_4$ 340. These measurements yield the expectation values:

$$\langle \hat{N}_L \rangle = \frac{\langle \psi_i | \hat{N}_L | \psi_i \rangle}{\langle \psi_i | \psi_i \rangle} = \frac{\frac{1}{2}[-i(1 - e^{-i\theta})\langle L_4| - (1 + e^{-i\theta})\langle R_4|]|L_4\rangle\langle L_4|}{\frac{1}{2}[-i(1 - e^{-i\theta})\langle L_4| - (1 + e^{-i\theta})\langle R_4|]} \cdot \frac{\frac{1}{2}[i(1 - e^{i\theta})|L_4\rangle - (1 + e^{i\theta})|R_4\rangle]}{\frac{1}{2}[i(1 - e^{i\theta})|L_4\rangle - (1 + e^{i\theta})|R_4\rangle]} \quad (25)$$

or $$\langle \hat{N}_L \rangle = \frac{1}{2}[1 - \cos\theta] \quad (26)$$

and $$\langle \hat{N}_R \rangle = \frac{\langle \psi_i | \hat{N}_R | \psi_i \rangle}{\langle \psi_i | \psi_i \rangle} = \frac{\frac{1}{2}[-i(1 - e^{-i\theta})\langle L_4| - (1 + e^{-i\theta})\langle R_4|]|R_4\rangle\langle R_4|}{\frac{1}{2}[-i(1 - e^{-i\theta})\langle L_4| - (1 + e^{-i\theta})\langle R_4|]} \cdot \frac{\frac{1}{2}[i(1 - e^{i\theta})|L_4\rangle - (1 + e^{i\theta})|R_4\rangle]}{\frac{1}{2}[i(1 - e^{i\theta})|L_4\rangle - (1 + e^{i\theta})|R_4\rangle]} \quad (27)$$

or $$\langle \hat{N}_R \rangle = \frac{1}{2}[1 + \cos\theta]. \quad (28)$$

Note that both of these expectation values depend only upon the phase angle $\theta$ at the indicator 510 in the first MZI 110 (because their values are determined solely by the pre-selected state $|\psi_i\rangle$), $$0 \leq \langle \hat{N}_L \rangle, \langle \hat{N}_R \rangle \leq 1 \text{ and } \langle \hat{N}_L \rangle + \langle \hat{N}_R \rangle = 1. \quad (29)$$

Thus, the number of photons measured in paths $L_4$ 440 or $R_4$ 340 is always non-negative and less than or equal to the number of photons input 140 into the apparatus (i.e., one), and the sum of the number of photons measured in paths $L_4$ 440 and $R_4$ 340 is always unity, i.e., the photon number is conserved (identical to the number of photons injected into the apparatus). For example:

(i) if $\theta=0$, then $\langle \hat{N}_L \rangle = 0$ and $\langle \hat{N}_R \rangle = 1$, (30)

so that the injected photon is in path $R_4$ 340;

(ii) if $\theta=\pi$, then $\langle \hat{N}_L \rangle = 1$ and $\langle \hat{N}_R \rangle = 0$, (31)

so that the injected photon is in path $L_4$ 440; and (iii) if $\theta = \pm\left(\frac{\pi}{2} + \delta\right)$, (32)

and $0 \leq \delta \ll 1$, then $$\langle \hat{N}_L \rangle = \frac{1}{2}[1 + \sin\delta] \quad (33)$$

and $$\langle \hat{N}_R \rangle = \frac{1}{2}[1 - \sin\delta],$$

and so that approximately half the injected photon is in each of $L_4$ 440 and $R_4$ 340 (if $\delta=0$, then exactly half the injected photon is in each path).

Now consider the number of weakly measured photons in paths $L_4$ 440 and $R_4$ 340 given by eqns. (19) and (20). When:

(a) $\theta=0=\phi$, then $(\hat{N}_L)_w=0$ and $(\hat{N}_R)_w=1$, (34)

so that the injected photon is weakly measured to be in path $R_4$ 340;

(b) $\theta=\pi=\phi$, then $(\hat{N}_L)_w=1$ and $(\hat{N}_R)_w=0$, (35)

so that the injected photon is weakly measured to be in path $L_4$ 440; and (c) $\theta = \pm\left(\frac{\pi}{2} + \delta\right)$, (36)

$0 \leq \delta \ll 1$, then $$(\hat{N}_L)_w = \frac{1}{2}[1 + \sin\delta] \quad (37)$$

and $$(\hat{N}_R)_w = \frac{1}{2}[1 - \sin\delta],$$

so that approximately half the injected photon is in each of $L_4$ 440 and $R_4$ 340. Although these weak values depend upon both the first MZI 110 phase angle $\theta$ and the third MZI 130 phase angle $\phi$, items (i) and (a), items (ii) and (b), and items (iii) and (c) are consistent with one another, i.e., the strongly and weakly measured number of photons in paths $L_4$ 440 and $R_4$ 340 are identical when the phase angles agree.

In contrast to this, when from eqn. (21), then:

($\alpha$) an arbitrarily large positive number of photons is weakly measured in path $L_4$; and ($\beta$) an associated large negative number of photons is weakly measured in path $R_4$.

This paradoxical behavior is a consequence of weak measurements combined with TSQM. More specifically, this behavior reflects the bizarre nature of the undisturbed quantum reality defined by the PPS states and occurs in part because the post-selected state is backward propagated through the apparatus and carries the phase angle $\phi$ at indicator 520 selected in the third MZI 130 to where the weak measurements are made in paths $L_4$ 440 or $R_4$ 340 in the second MZI 120.

Clearly, when statements ($\alpha$) and ($\beta$) are considered separately, they contradict the fact that there is only one photon in the apparatus. However, weak measurements and TSQM resolve this paradox in an interesting manner—when ($\alpha$) and ($\beta$) are taken together they satisfy the relation:

$$(\hat{N}_L)_w + (\hat{N}_R)_w = 1. \quad (38)$$

The sum in eqn. (38) is a general photon number conservation equation for weak values analogous to eqn. (29). This states that the total number of weakly measured photons in the apparatus along paths $L_4$ 440 and $R_4$ 340 is identical to the number injected (i.e., one) when the pre- and post-selected states are forward and backward propagated through the apparatus to paths $L_4$ 440 and $R_4$ 340. One should note that—as required—items (a) through (c) also satisfy eqn. (38).

A potential practical application of the cascade apparatus described in exemplary embodiments is the general amplification of any weak signal that can be transduced to mirror $M_3$ 230 or $M_4$ 240. In particular, when the PPS states are $|R_1\rangle$ and $|L_8\rangle$, classically intense laser light is injected into port $R_1$ 310, and consequently from eqn. (21), then a very small change in the position of $M_3$ 230 or $M_4$ 240 caused by a weak input signal can be detected by a sudden large translation (i.e., numerical shift) in the intensity distribution of the light emerging from port $L_8$ 480. However, as noted from eqn. (24), the emergent light intensity will be attenuated by the factor $(\delta+\epsilon)^2$.

Another possible application includes usage as a phase angle comparator. For example, by setting phase angle $$\theta = \frac{\pi}{2} + \delta$$

and slowly varying phase angle $\phi$ around $$-\frac{\pi}{2},$$

the phase angle $$\varphi = -\left(\frac{\pi}{2} + \delta\right)$$

can be found because the non-linear behavior suddenly occurs precisely when the phase angles $$\theta = \frac{\pi}{2} + \delta = -\varphi,$$

resulting in a sudden large translation of the intensity distribution of the light emerging from port $L_8$ 480.

The paradoxical behavior identified and discussed above suggests that weak measurements combined with TSQM can be exploited to "create" large positive and negative numbers of "photons" in the apparatus. Although these peculiar values are at variance with traditional interpretation and intuition, they are logically consistent with particle conservation and reflect the bizarre nature of the undisturbed underlying quantum reality. The logic of such features has been discussed in the literature. See Y. Aharonov et al., *Phys. Lett.* A 301, 13 (2002). This has also been observed experimentally. See K. Resch et al., *Phys. Lett.* A 324 125 (2004); and Y. Yokota et al., *New J. Phys.* 11 033011 (2009).

VII. Directional Transformation:

Forward transformations for MZI units can be expressed for 50/50 beam-splitters 150 as:

$$|R_j\rangle \xrightarrow{B} \frac{1}{\sqrt{2}}[|R_{j+1}\rangle + i|L_{j+1}\rangle] \quad (39)$$

and $$|L_j\rangle \xrightarrow{B} \frac{1}{\sqrt{2}}[|L_{j+1}\rangle + i|R_{j+1}\rangle].$$

Similarly, such transformation for mirrors 200 can be expressed as:

$$|R_j\rangle \xrightarrow{M} i|L_{j+1}\rangle \quad (40)$$

and $$|L_j\rangle \xrightarrow{M} i|R_{j+1}\rangle$$

Similarly, such transformation for phase shifters 510 and 520 can be expressed as:

$$|R_j\rangle \xrightarrow{\varphi} e^{i\varphi}|R_j\rangle \quad (41)$$

and $$|L_j\rangle \xrightarrow{\varphi} e^{i\varphi}|L_j\rangle.$$

Backward transformations for MZI units can be expressed for 50/50 beam-splitters 150 as:

$$|R_{j+1}\rangle \xrightarrow{B} \frac{1}{\sqrt{2}}[|R_j\rangle - i|L_j\rangle] \quad (42)$$

and $$|L_{j+1}\rangle \xrightarrow{B} \frac{1}{\sqrt{2}}[|L_j\rangle - i|R_j\rangle].$$

Similarly, such transformation for mirrors 200 can be expressed as:

$$|R_{j+1}\rangle \xrightarrow{M} -i|L_j\rangle \quad (43)$$

and $$|L_{j+1}\rangle \xrightarrow{M} -i|R_j\rangle.$$

Such transformation for phase shifters 510 and 520 can be expressed as:

$$|R_j\rangle \xrightarrow{\varphi} e^{-i\varphi}|R_j\rangle \quad (44)$$

and $$|L_j\rangle \xrightarrow{\varphi} e^{-i\varphi}|L_j\rangle.$$

Further information is available from A. D. Parks and S. E. Spence, "Paradoxical behavior in a triple cascade of Mach-Zehnder interferometers", *J. of Physics A: Math. Theor.* 46 (2013) at http://iopscience.iop.org/1751-8121/46/3/035303/pdf/1751-8121_46__3_035303.pdf via IOP publishing. While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A signal amplifier via a triple Mach-Zehnder interferometer (MZI) apparatus for determining intensity distribution at an output port by a photon source, said MZI apparatus comprising:
   first, second, third and fourth beam-splitters disposed co-linearly in parallel between the source and first and second ports;
   first, second, third, fourth, fifth and sixth mirrors, said first, third and fifth mirrors disposed co-linearly in parallel and displaced from said beam-splitters along a first direction, said second, fourth and sixth mirrors disposed co-linearly in parallel and displaced from said beam-splitters along a second direction;
   a first path projector for conducting a first weak measurement of a first photon occupation number, said first path projector being disposed between said second beam-splitter and said third mirror effectively responsive to displacing said third mirror away from said fourth mirror; and
   a second path projector for conducting a second weak measurement of a second photon occupation number, said second path projector being disposed between said second beam-splitter and said fourth mirror effectively responsive to displacing said fourth mirror away from said third mirror, wherein
   the output port is disposed beyond said fourth beam-splitter in said first direction, and
   the intensity distribution at the output port is positive in response to one of said first measurement being positive and said second measurement being negative.

2. The MZI apparatus according to claim 1, wherein at least one of said third and fourth mirrors is displaced laterally from said beam-splitters by a finite distance corresponding to measurement interaction strength.

3. The MZI apparatus according to claim 2, wherein said finite distance is adjusted until said first and second photon occupation numbers produce detectably significant weak values.

4. The MZI apparatus according to claim 1, further including:
   a first phase shift window for determining a first phase angle, said first phase shift window being disposed between said first mirror and said second beam-splitter; and
   a second phase shift window for determining a second phase angle, said second phase shift window being disposed between said fifth mirror and said fourth beam-splitter.

5. The MZI apparatus according to claim 4, wherein said first phase angle equals one-half $\pi$ plus a first difference angle and said second phase angle equals one-half $\pi$ minus a second difference angle, with both difference angles being small and positive, such that
   said first weak measurement of said first occupation number corresponds approximately to a reciprocal of a sum of said difference angles, and
   said second weak measurement of said second occupation number corresponds approximately to a negative reciprocal of said sum.

* * * * *